Patented Jan. 5, 1943

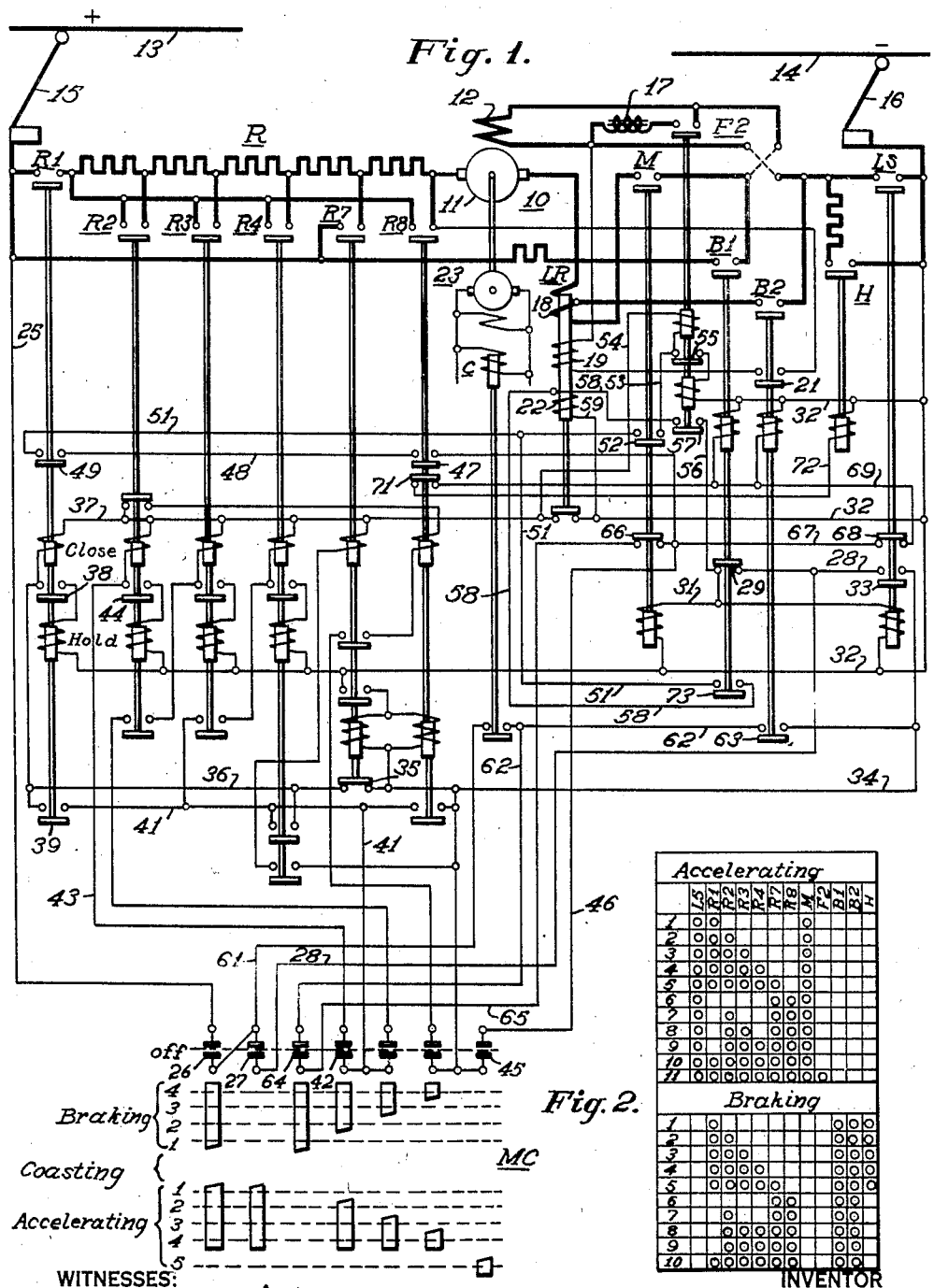

2,307,481

UNITED STATES PATENT OFFICE 2,307,481

MOTOR CONTROL SYSTEM

Bascum O. Austin, Forest Hills, Pa., assignor to Westinghouse Electric & Manufacturing Company, East Pittsburgh, Pa., a corporation of Pennsylvania Application July 26, 1940, Serial No. 347,687

11 Claims. (Cl. 172—179)

My invention relates, generally, to motor control systems and, more particularly, to systems for controlling the operation of the propelling motors of electric vehicles, such as trolley buses.

An object of my invention, generally stated, is to provide a control system for an electrically propelled vehicle which shall be simple and efficient in operation and which may be economically manufactured and installed.

A more specific object of my invention is to provide for controlling the acceleration, coasting and braking of an electrically propelled vehicle by means of a single controller.

Another object of my invention is to effect a saving in the power required to operate the control equipment of an electrically propelled vehicle.

A further object of my invention is to protect the control equipment of a motor control system from overheating.

Other objects of my invention will be explained fully hereinafter or will be apparent to those skilled in the art.

In practicing my invention, a single controller of the drum type, which may be pedal operated, is so constructed that the first part of its travel is devoted to dynamic braking, the next part is devoted to coasting and the last part is devoted to the application of power to the vehicle motor. A limit relay functions to deenergize the closing coils of the resistor shunting switches when the control has completed an operating cycle either for braking or acceleration, thereby reducing the temperature of these coils and effecting a saving in the power required to operate the control equipment. Further protection against overheating of the control equipment is obtained by deenergizing the dynamic braking equipment when dynamic braking has faded out as the vehicle comes to a standstill.

For a fuller understanding of the nature and objects of my invention, reference may be had to the following detailed description, taken in conjunction with the accompanying drawing, in which:

Figure 1 is a diagrammatic view of a control system embodying my invention; and

Fig. 2 is a chart showing the sequence of operation of a portion of the equipment illustrated in Fig. 1.

Referring to the drawing, the system shown therein comprises a motor 10 having an armature winding 11 and a series field winding 12, a line switch LS and a switch M for connecting the motor to power conductors 13 and 14, thereby supplying power to the motor through current collectors 15 and 16, respectively; a pair of switches B1 and B2 for establishing dynamic braking connections for the motor, and a switch H for connecting the field winding 12 across the power conductors 13 and 14 during a portion of the dynamic braking cycle to insure that the dynamic braking action of the motor builds up quickly.

In order to control the motor current during the accelerating and dynamic braking periods, a resistor R is provided which is shunted from the motor circuit step by step by means of resistor shunting switches R1, R2, R3, R4, R7 and R8, which are actuated in sequential relation, as shown in the sequence chart in Fig. 2, during both the accelerating and braking cycles. A field shunting switch F2 is provided for shunting the field winding 12 through a reactor 17 in order to secure maximum speed of the motor 10 in a manner well known in the art.

In order that the sequential operation of the resistor shunting switches and the field shunting switch may be controlled by interlock progression with a relatively few number of interlocks on these switches, each switch is provided with a closing coil and a holding coil. The closing coil is energized to close the switch, after which the holding coil is energized to retain the switch in the closed position, it being unnecessary to maintain the closing coil energized after the holding coil becomes energized.

In accordance with the usual practice, the progression of the resistor shunting switches, both during acceleration and dynamic braking, is automatically controlled by a current limit relay LR, thereby preventing an excessive amount of current flowing through the motor windings. The relay LR is provided with the usual series coil winding 18, which is connected in the armature circuit for the motor 10, and a calibrating winding 19 which is connected across the armature winding 11 of the motor through an interlock 21 on the switch B2 during dynamic braking to change the calibration of the relay LR during the dynamic braking period.

In addition to the windings 18 and 19, the relay LR is also provided with a shunt winding 22 which is energized when the control has completed its sequence of operation either during the accelerating or the braking cycles. The excitation of the shunt coil 22 causes the limit relay to be held in the open position. The holding of the limit relay in the open position disconnects all the closing coils of the resistor shunting switches and the field shunting switch F2 from the line and only the holding coils remain energized after the control sequence is completed. As will be explained more fully hereinafter, the energization of the coil 22 is controlled by interlocks provided on the resistor shunting switches and the field shunting switch F2. In this manner, the temperature of the closing coils is materially reduced, since they are no longer continuously energized and, furthermore, a saving in the energy required to operate the control equipment is effected.

With a view to still further protecting the control equipment against overheating and also reducing the control energy required, a relay or contactor C, having its operating coil connected across a battery charging generator 23, is provided. The contact members of the relay C are so connected in the control circuits that the dynamic braking equipment is disconnected when the contact members of the relay are in the open position. Since the generator 23 is driven by the motor 10, it will be seen that the voltage of the generator is proportional to the speed of the motor and the vehicle. The generator 23 is so designed that it begins to charge the battery (not shown) when the vehicle attains a predetermined speed, such as, for example, 8 miles per hour and ceases to charge the battery at a slightly less speed. Therefore, when the vehicle is started and reaches a speed of approximately 8 miles per hour, the contactor C is closed and the dynamic braking equipment may be utilized. When the vehicle speed drops to something less than 8 miles per hour, the contactor C opens and the dynamic braking equipment is disconnected, thereby preventing the overheating of this equipment while the vehicle is standing. The operation of the contactor C in the foregoing manner does not interfere with the usual function of the dynamic braking equipment since the dynamic braking action normally fades out at approximately the speed for which the relay C is set to operate, and it is necessary to bring the vehicle to a complete stop by means of an air or other braking system.

In order to simplify the operation of the vehicle, dynamic braking, coasting and accelerating or application of power to the vehicle are all controlled by one controller MC which may be of the cam type and pedal operated, if desired. As shown, the controller MC is so constructed that one portion of the controller is utilized for dynamic braking, another portion for coasting and still another portion for accelerating. When the controller is actuated from the off or normal position, it passes through the braking position, the coasting position and then through the accelerating position, the maximum speed of the vehicle being obtained by actuating the controller to the full power position, at which time the switch F2 is closed to shunt the field winding of the motor, as explained hereinafter. Beginning at the full power position, the first initial motion of the controller MC in the backward direction changes the motor from short field to full field. Further movement towards the coasting position begins to insert resistance in series with the motor, thereby softening the shutoff of power. Passing through the coasting position, at which time the motor is disconnected from the power conductors, the first braking point is then obtained. Continued motion towards the normal position brings in additional points of braking by closing the resistor shunting switches to shunt the resistor R from the armature circuit. Thus, it will be seen that the operation of the vehicle may be controlled by one pedal and that maximum speed is obtained when the pedal is fully depressed and maximum braking is obtained by returning the pedal to the last braking position.

In order that the functioning of the foregoing equipment may be more clearly understood, the operation of the sytem will now be described in more detail. Assuming that it is desired to accelerate the vehicle at the maximum rate, the controller MC is actuated to its last or full-power position. Since it is assumed that the vehicle is starting from standstill, nothing happens as the controller is moved through the braking and the coasting positions. When the first accelerating position is reached, the switches LS, R1 and M are closed to connect the motor across the power conductors 13 and 14 in series with the resistor R.

The energizing circuit for the closing coil of the switch LS may be traced from the power conductor 13 through the current collector 15, conductor 25, contact members 26 and 27 of the controller MC, conductor 28, an interlock 29 on the switch B1, conductor 31, the actuating coil of the switch LS, conductor 32, and the current collector 16 to the negative power conductor 14.

The energizing circuit for the coil of the switch M extends from the conductor 31 through the coil to the negative conductor 32.

Following the closing of the switch LS, the closing coil of the switch R1 is energized through a circuit which may be traced from the previously energized conductor 28 through an interlock 33 on the switch LS, conductor 34, an interlock 35 on the switch R7, conductor 36, the closing coil of the switch R1, conductor 37, and the contact members of the relay LR to the negative conductor 32. Following the closing of the switch R1, the holding coil of this switch is energized through a circuit which extends from the conductor 36 through an interlock 38 and the holding coil to the negative conductor 32.

When the controller reaches the second accelerating position, the switch R2 is closed to shunt one step of the resistor R from the motor circuit. The energizing circuit for the switch R2 may be traced from the previously energized conductor 36 through an interlock 39 on the switch R1, conductor 41, contact members 42 on the controller MC, conductor 43, the closing coil of the switch R2, conductor 37, and the contact members of the relay LR to the negative conductor 32. The holding coil of the switch R2 is energized through an interlock 44 on the switch when the switch is actuated to the closed position.

Following the closing of the switch R2, the switches R3, R4, R7 and R8 are closed by interlock progression in a manner well known in the art. As shown in the sequence chart, the switches R1, R2, R3 and R4 are opened upon the closing of the switch R7. Thus the resistor R is connected in the motor circuit in two parallel paths and the switches R2, R3, R4 and R1 are reclosed in the order shown in the sequence chart to completely shunt the resistor R from the motor circuit. Since the operation of the resistor shunting switches by interlock progression under the control of the limit relay LR is well known in the railway control art, it is believed to be unnecessary to trace all of the control circuits for these switches in detail.

As previously explained, the field shunting switch F2 is closed at the end of the accelerating cycle to shunt the field winding 12 through the reactor 17. The energizing circuit for the closing coil of the switch F2 may be traced from the previously energized conductor 34 through contact members 45 of the controller MC, conductor 46, an interlock 47 on the switch R8, conductor 48, an interlock 49 on the switch R1, conductor 51, an interlock 52 on the switch M, conductor 53, the closing coil of the switch F2, conductor 54 and the contact members of the relay LR to the negative conductor 32. The holding coil of the switch F2 is energized through an interlock 55 when the switch is closed.

As explained hereinbefore, the coil 22 of the relay LR is energized at the end of the accelerating cycle to open the contact members of the limit relay, thereby deenergizing the closing coils on the resistor shunting switches and the switch F2. The energizing circuit for the coil 22 may be traced from the previously energized conductor 28 through the interlock 29 on the switch B1, conductor 56, an interlock 57 on the switch F2, conductor 58, the coil 22 and conductor 59 to the negative conductor 32.

In this manner, the closing coils are deenergized to prevent overheating of these coils. However, the resistor shunting switches and the field shunting switch F2 are maintained closed by the holding coils during operation of the vehicle. It will be understood that the holding coils require less current than the closing coils, since it is only necessary for them to retain the switches in the closed position after they have once been closed by the closing coils.

If it is desired to decelerate the vehicle by means of dynamic braking, the controller MC is returned toward the off position, the maximum braking rate being obtained when the controller is in the last braking position. It will be understood that the motor is disconnected from the power source when the controller passes through the coasting position, since all of the control equipment is deenergized.

When the controller reaches the first braking position, the switches R1, B1, B2 and H are closed. The switches R1, B1 and B2 establish a dynamic braking circuit for the armature of the motor through the resistor R, and the switch H, in conjunction with the switch B1, connects the field winding 12 of the motor across the power conductors to excite the field winding, thereby causing a rapid buildup of the motor current to insure a quick braking effect.

The energizing circuit for the switch R1 may be traced from the conductor 25 through the contact members 26 of the controller MC, conductor 61, the contact members of the relay C which, as explained hereinbefore, is closed at this time, since the vehicle is operating at a high speed, conductor 62, an interlock 63 on the switch B2, conductor 34, the interlock 35 on the switch R7, conductor 36, the closing coil of the switch R1, conductor 37 and the contact members of the relay LR to the negative conductor 32.

The energizing circuit for the switch B1 may be traced from the previously energized conductor 62 through contact members 64 of the controller MC, conductor 65, an interlock 66 on the switch M, conductor 67, an interlock 68, on the switch LS, conductor 69, and the actuating coil of the switch B1 to the negative conductor 32.

The energizing circuit for the coil of the switch B2 extends from the conductor 69 through the coil of the switch to the negative conductor 32. The closing of the switch B2 closes its interlock 63 to permit closing of the switch R1, as previously described. Likewise, the energizing circuit for the actuating coil of the switch H extends from the previously energized conductor 69 through an interlock 71 on the switch R8, conductor 72, and the actuating coil of the switch H to the negative conductor 32.

The resistor shunting switches R2, R3, R4, R7 and R8 are closed in the order shown in the sequence chart to shunt the resistor R from the motor circuit in the same manner as during acceleration of the vehicle, the operation of the switches being automatically controlled by the limit relay LR. It will be noted that the switch H is deenergized upon the closing of the switch R8, thereby disconnecting the field winding 12 from the power conductors. However, since the field winding is connected in the armature circuit, it is excited by the armature current, thereby continuing the braking action of the motor until the vehicle has decelerated to the speed at which the relay C drops out to deenergize the braking equipment.

As explained hereinbefore, the coil 22 of the relay LR is energized at the end of the braking sequence, that is, when the operation of the resistor shunting switches is completed. The energizing circuit for the coil 22 at this time may be traced from the previously energized conductor 51 through an interlock 73 on the switch B1, conductor 58, the coil 22, and conductor 59 to the negative conductor 32. In this manner, the relay LR is actuated to its raised position to deenergize the closing coils of the resistor shunting switches after they have completed their sequence of operation during dynamic braking in the same manner as during acceleration. Furthermore, the contactor C deenergizes all of the braking equipment when the dynamic brake action has faded out, thereby preventing the control equipment from being overheated while the vehicle is standing.

From the foregoing description, it is apparent that I have provided a control system which simplifies the operation of the vehicle, since only one controller is required for both acceleration and braking, it being necessary to operate the controller in only one direction for acceleration and in the reverse direction for braking. Furthermore, the control equipment is protected against overheating even though the duty imposed on the equipment by providing for dynamic braking of the vehicle is considerably greater than is normally required for controlling a vehicle not having dynamic braking, since the equipment must operate practically continuously. In this manner, the construction of the equipment is simplified, thereby reducing its cost and, furthermore, a saving in the power required to operate the equipment is made.

Since many modifications may be made in the apparatus and arrangement of parts without departing from the spirit of my invention, I do not wish to be limited otherwise than by the scope of the appended claims.

I claim as my invention:

1. In a motor control system, the combination with a motor and a source of power therefor, of switching means for connecting the motor to the power source, additional switching means for establishing dynamic braking connections for the motor, and a controller for controlling the operation of said switching means, said controller being actuated from a normal or off position through braking, coasting and accelerating positions in sequential relation, said braking and coasting positions being ineffective during the accelerating sequence.

2. In a motor control system, the combination with a motor and a source of power therefor, of switching means for connecting the motor to the power source, additional switching means for establishing dynamic braking connections for the motor, and a controller for controlling the operation of said switching means, said controller being actuated from a normal or off position through braking, coasting and accelerating positions in sequential relation, maximum braking effect being obtained as the controller is returned toward the off position, said braking and coasting positions being ineffective during the accelerating sequence.

3. In a motor control system, the combination with a motor and a source of power therefor, of switching means for connecting the motor to the power source, additional switching means for establishing dynamic braking connections for the motor, and a controller for controlling the operation of said switching means, said controller being actuated from a normal or off position through braking, coasting and accelerating positions in sequential relation, maximum acceleration being obtained by actuating the controller from the coasting position through the accelerating positions and maximum braking being obtained by actuating the controller from the coasting position through the braking positions toward the off position, said braking and coasting positions being ineffective during the accelerating sequence.

4. In a motor control system, the combination with a motor and a source of power therefor, of switching means for connecting the motor to the power source, accelerating switches for controlling the operation of the motor, closing means and holding means for said accelerating switches, said accelerating switches being operated in sequential relation, means for deenergizing the closing means of said accelerating switches upon the completion of a sequence of operation and means actuated by said accelerating switches for controlling the operation of said deenergizing means.

5. In a motor control system, the combination with a motor and a source of power therefor, of switching means for connecting the motor to the power source, accelerating switches for controlling the operation of the motor, closing means and holding means for said accelerating switches, said accelerating switches being operated in sequential relation, and relay means responsive to the completion of an operating sequence for deenergizing the closing means of said accelerating switches.

6. In a motor control system, the combination with a motor and a source of power therefor, of switching means for connecting the motor to the power source, accelerating switches for controlling the operation of the motor, closing means and holding means for said accelerating switches, said accelerating switches being operated in sequential relation, relay means for deenergizing the closing means of said accelerating switches upon the completion of an operating sequence, and interlocking means actuated by said accelerating switches for controlling the energization of said relay means.

7. In a motor control system, the combination with a motor and a source of power therefor, of switching means for connecting the motor to the power source, accelerating switches for controlling the operation of the motor, said accelerating switches being operated in sequential relation, each of said switches having a closing coil and a holding coil, and relay means responsive to the completion of an operating sequence for deenergizing the closing coils of said switches.

8. In a motor control system, the combination with a motor and a source of power therefor, of switching means for connecting the motor to the power source, accelerating switches for controlling the operation of the motor, said accelerating switches being operated in sequential relation, each of said switches having a closing coil and a holding coil, a limit relay for controlling the energization of said closing coils, and means associated with said limit relay responsive to the completion of an operating sequence for actuating said relay to deenergize said closing coils.

9. In a motor control system, the combination with a motor and a source of power therefor, of switching means for connecting the motor to the power source, additional switching means for establishing dynamic braking connections for the motor, and means responsive to the speed of the motor for controlling the operation of said additional switching means.

10. In a motor control system, the combination with a motor and a source of power for driving a vehicle, of switching means for connecting the motor to a power source, additional switching means for establishing dynamic braking connections for the motor, a controller for controlling the operation of said switching means, and relay means responsive to the speed of the vehicle for cooperating with said controller in controlling the operation of said additional switching means.

11. In a motor control system, the combination with a motor and a source of power therefor of switching means for connecting the motor to the power source, additional switching means for establishing dynamic braking connections for the motor, a controller having a non-operative position, a braking position, a coasting position and accelerating positions for controlling the operation of said switching means, said controller being actuated from the non-operative position through the braking, coasting, and accelerating positions in sequential relation to accelerate said motor and from said accelerating positions through said coasting and braking positions to said non-operative position to decelerate the motor, and means for rendering said braking and coasting positions inoperative to control said switching means during the acceleration sequence.

BASCUM O. AUSTIN.